Figure 1:
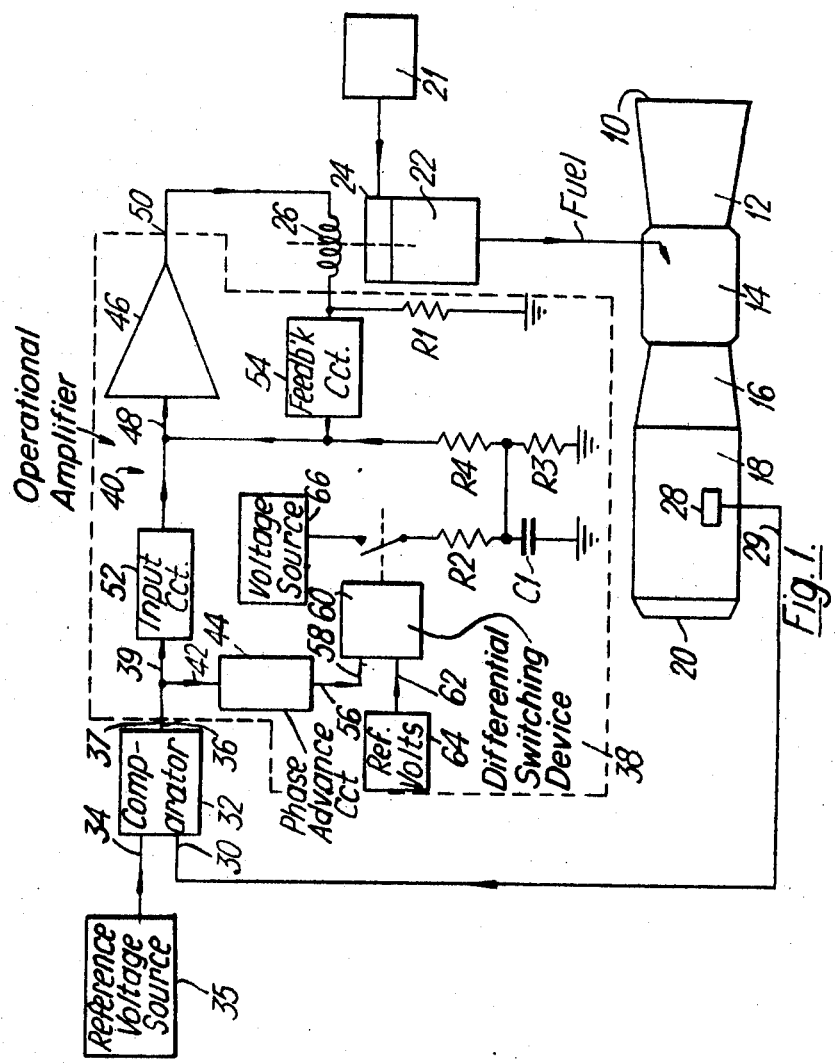

United States Patent [19]
Beadman et al.

[11] 3,739,250
[45] June 12, 1973

[54] ELECTRONIC RATE MEANS FOR A SERVO DRIVEN FUEL CONTROL

[75] Inventors: Terence Brockley Beadman, Ashby-de-la-Zouch, England

[73] Assignee: Rolls Royce Limited, Derby, England

[22] Filed: Sept. 14, 1970

[21] Appl. No.: 71,664

[30] Foreign Application Priority Data
Sept. 18, 1969 Great Britain ................... 46,015/69

[52] U.S. Cl. ............. 318/610, 318/621, 60/39.28 T
[51] Int. Cl. ........................................ G05b 11/42
[58] Field of Search ............... 60/39.28 T; 318/610, 318/621

[56] References Cited
UNITED STATES PATENTS

| | | | |
|---|---|---|---|
| 3,478,512 | 11/1969 | Brahm | 60/39.28 |
| 3,063,243 | 11/1962 | Bancroft | 60/39.28 T |
| 3,413,806 | 12/1968 | Belke | 60/39.28 |
| 3,520,133 | 7/1970 | Loft | 60/39.28 |
| 3,546,598 | 12/1970 | McCauley | 60/39.28 |
| 3,510,737 | 5/1970 | Brown et al. | 318/621 X |

Primary Examiner—T. E. Lynch
Attorney—Cushman, Darby and Cushman

[57] ABSTRACT

This invention concerns an electronic control system suitable for controlling jet pipe temperature or rotational speed of a gas turbine engine rotor shaft. The control system is adapted to operate a solenoid which is connected to a valve in the fuel system of the engine to reduce the flow of fuel to the engine when an electrical output signal from the control system exceeds the value of a reference signal generated by the control system.

5 Claims, 2 Drawing Figures

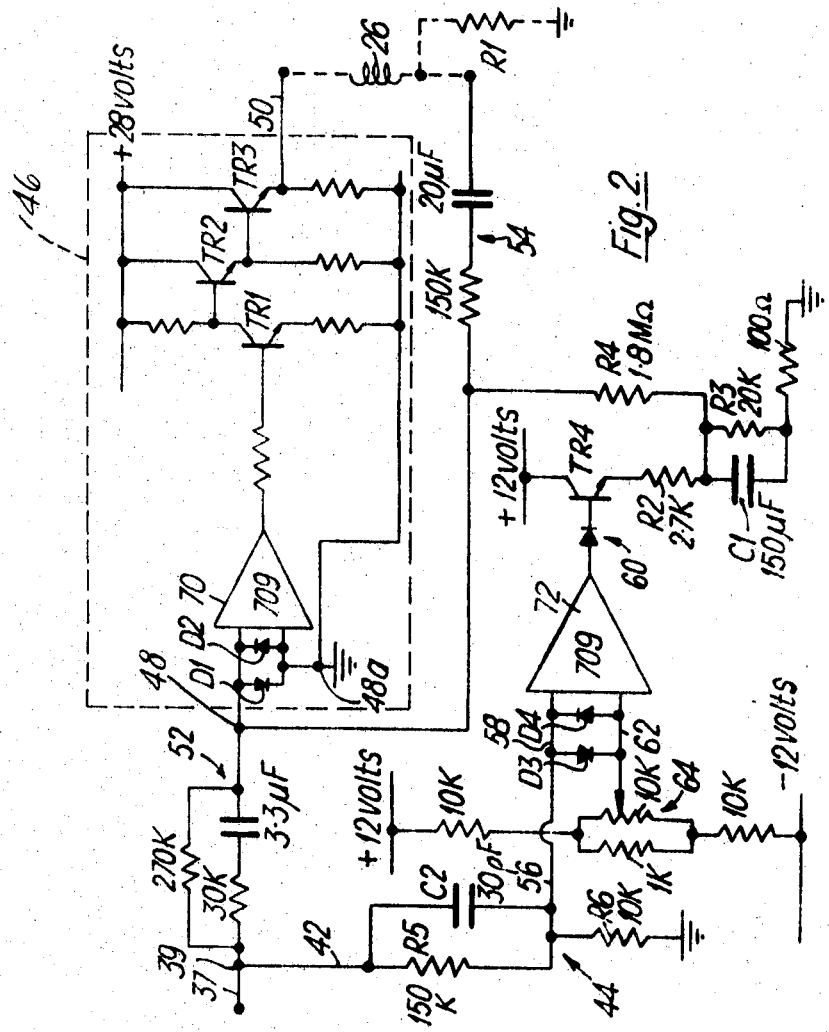

ELECTRONIC RATE MEANS FOR A SERVO DRIVEN FUEL CONTROL

This invention relates to electronic control means for use in a closed-loop control system, and is particularly but not exclusively concerned with electronic control means for use in a closed-loop control system for controlling the jet pipe temperature of a gas turbine engine.

According to the present invention, electronic control means for use in a closed-loop control system comprises an input adapted to be connected to receive an error signal from the system to be controlled; operational amplifier means comprising a high gain amplifier, an input circuit connected between said input and the input of the high gain amplifier and an output adapted to be connected to the system to be controlled; and phase-advance means connected between said input and the input of the high gain amplifier and adapted to supply an additional error signal to the input of the high gain amplifier when the phase-advanced error signal exceeds a predetermined value.

In a preferred embodiment of the invention, the phase-advance means comprises a phase-advance circuit and a differential switching amplifier having one input connected to the output of the phase-advance circuit and the other input connected to receive a fixed reference voltage.

The phase-advance means preferably also includes means for causing the additional error signal produced thereby to rise asymptotically to a fixed level when the phase-advanced error signal exceeds the predetermined level, which means may be further arranged to cause the additional signal to decay asymptotically when the phase-advanced error signal falls below the predetermined level.

Thus the output of the differential switching amplifier may be connected to means for charging a capacitor, the voltage across the capacitor constituting the additional error signal.

The invention also includes a closed-loop control system incorporating electronic control means in accordance with any of the preceding paragraphs.

Thus the closed-loop control system may be adapted to control the value of an operating parameter, for example the jet pipe temperature and/or the rotational speed of a compressor drive shaft of a gas turbine engine, and may comprise means for producing an electrical signal dependent upon the operating parameter and signal comparison means connected to receive said electrical signal and a predetermined reference signal and adapted to produce the error signal when the value of said electrical signal exceeds the value of the reference signal.

The system to be controlled may include a solenoid connected to the output of the operational amplifier means, the solenoid preferably being included within the feedback loop of the operational amplifier means.

Preferably, the solenoid is operatively connected to a valve in the fuel flow system of the gas turbine engine, whereby to reduce the flow of fuel to the engine when the value of said electrical signal exceeds the value of the reference signal.

The invention further comprises a gas turbine engine provided with a closed-loop control system as set forth above.

The invention will now be particularly described, by way of non-limitative example only, with reference to the accompanying drawings, of which:

FIG. 1 is a schematic block diagram of a gas turbine engine provided with a jet pipe temperature control system incorporating electronic control means in accordance with the present invention; and FIG. 2 is a circuit diagram of the electronic control means of FIG. 1.

The gas turbine engine shown in FIG. 1 comprises, in flow series, an air intake 10, a compressor 12, combustion equipment 14, a turbine 16 drivingly connected to the compressor 12, a jet pipe 18, and a propulsion nozzle 20. Fuel is supplied to the combustion equipment 14 from a tank 21 by a fuel control unit 22 which incorporates a flow reducing valve 24 operated by a solenoid 26.

A temperature transducer 28 is mounted in the jet pipe 18, and produces a D.C. electrical signal whose voltage is dependent upon the temperature of the exhaust gases of the engine (T6). The output 29 of the transducer 28 is connected to one input 30 of a comparator 32 whose other input 34 is connected to a reference voltage source 35. When the voltage of the signal produced by the transducer 28 exceeds the reference voltage of the source 35, i.e., when T6 exceeds its maximum permissible value, the comparator 32 produces at its output 36 a T6 error signal whose voltage is proportional to the difference between these voltages.

The output 36 of the comparator 32 is connected to the input 37 of electronic control means 38 which comprises an operational amplifier 40 having an input 39 connected to the input 37 and a phase advance circuit 44 having an input 42 connected to the input 37. The operational amplifier 40 comprises a high gain amplifier 46 having an input 48 and an output 50, an input circuit 52 being connected between the input 39 and the input 48. The output 50 of the high gain amplifier 46 constitutes the outputs of both the operational amplifier 40 and the electronic control means 38 and is connected to energise the solenoid 26. A small resistor R1 is connected between the solenoid 26 and earth, and a feedback circuit 54 is connected between the junction of the resistor R1 and the solenoid 26 and the input 48 of the high gain amplifier 46, thereby including the solenoid 26 within the feedback loop of the operational amplifier 40.

The output 56 of the phase-advance circuit 44 is connected to one input 58 of a differential switching device 60, the other input 62 of which is connected to a reference voltage source 64. The differential switching device 60 has two states, in the first of which is arranged to charge a capacitor C1 via a resistor R2 connected to a fixed voltage source 66 and in the second of which it is arranged to discharge the capacitor C1 via a resistor R3. The capacitor C1 is also connected, via a resistor R4, to the input 48 of the high gain amplifier 46.

In use, if the T6 error signal is increasing comparatively slowly, for example during moderate accelerations of the engine, it is amplified in the electronic control means 38 by the operational amplifier 40 alone so as to energise the solenoid 26. The solenoid 26 is thus gradually energised and causes the valve 24 to reduce the flow of fuel to the combustion equipment 14 of the engine comparatively slowly so as to reduce T6. However, when the rate of rise of the T6 error signal exceeds a predetermined rate, for example during slam accelerations of the engine, the voltage of the output signal produced by the phase-advance circuit 44 exceeds the voltage of the reference voltage source 64. This causes the differential switching amplifier 60 to change its state, thereby charging the capacitor C1 from the fixed voltage source 66. The voltage across the capacitor C1 thus rises asymptotically towards the fixed voltage of the source 66 in accordance with an inverse exponential law, and this asymptotically increasing voltage is applied to the input 48 of the high gain amplifier 46 via R1 as an additional error signal. The solenoid 26 is therefore more rapidly energised, which causes the valve 24 to reduce the flow of fuel to the combustion equipment 14 of the engine more rapidly, thus reducing T6 more rapidly.

When the rate of rise of the T6 error signal falls below the predetermined rate, the differential switching amplifier 60 returns to its original state, causing the capacitor C1 to discharge asymptotically to zero in accordance with an inverse exponential law. It will be appreciated that the time constants for the charging and discharging of C1 are not necessarily the same, and can have any suitable value.

The electronic control means 38 thus has increased gain for rapidly rising T6 error signals and thus reduces the flow of fuel to the combustion equipment 14 of the engine more rapidly. This minimises both the amount by which T6 overshoots the maximum permissible value and the total time for which T6 exceeds the maximum permissible value, which in turn reduces thermal fatigue in the engine and increases engine life.

A typical circuit for the electronic control means 38 is shown in FIG. 2. The high gain amplifier 46 comprises an integrated circuit differential amplifier 70 arranged to drive a simple amplifier constituted by a transistor TR1 connected in the grounded-emitter configuration, which is in turn connected to drive two emitter-follower stages TR2, TR3 in cascade. The gain of the differential amplifier 70 is sufficiently high for the overall gain of the operational amplifier 40 to be substantially independent thereof. One input of the differential amplifier 70 constitutes the input 48, while the other input 48a is earthed. A pair of oppositely directed diodes D1, D2 are connected in parallel between the inputs 48, 48a so as to clamp the voltage at the input 48 within about 0.7 volts of earth.

The differential switching device 60 also comprises an integrated circuit differential amplifier 72, which is connected to drive an emitter-follower stage TR4 which is in turn arranged to charge the capacitor C1 via the resistor R2. The capacitor C1 discharges through the resistor R3. A pair of oppositely directed diodes D3, D4 are connected in parallel between the inputs 58, 62 so as to clamp the voltage at the input 58 within about 0.7 volts of the voltage at the input 62.

The phase-advance circuit 44 is of simple type and comprises a capacitor C2 and resistors R5 and R6. The input circuit 52 and the feedback circuit 54 of the operational amplifier 40 are composed of passive elements and are chosen to give the operational amplifier the required gain and frequency response.

It will be appreciated that many modifications may be made to the described electronic control means. For example, the load driven by the operational amplifier 40 need not be included within its feedback loop, while any suitable high gain amplifier may replace the amplifier 70. Also, the differential switching device 60 could comprise a differential amplifier arranged to drive a change-over relay.

It will also be appreciated that the electronic control means described herein may be used in types of closed-loop control system other than gas turbine engine jet pipe temperature control systems. Additionally, the electronic control means may be used to control several parameters, for example jet pipe temperature and the rotational speed of a compressor drive shaft, simultaneously by connecting a multi-input "highest wins" circuit in series with the input 30 of the comparator 32. In this case electrical signals dependent upon the parameters to be controlled would be supplied to the respective inputs of the "highest wins" circuit, only the higher or highest being transmitted to the output thereof. A simple "highest wins" circuit comprises a plurality of diodes, one connected between each input and a common resistor. The highest input forward biases its own diode and reverse biases the other or others.

What we claim is:

1. A gas turbine engine fuel control system including a closed loop electronic control system comprising:
    means for detecting the jet pipe temperature of the gas turbine engine,
    means for detecting an error between the jet pipe temperature and the required temperature and for producing an error signal dependent thereon,
    means for adjusting the fuel supply system to the engine to reduce said error,
    an input adapted for connection to receive said error signal,
    operational amplifier means comprising a high gain amplifier,
    an input circuit connected between said input and the input of the high gain amplifier and an output adapted for connection to the means for adjusting the fuel supply,
    phase advance means connected between said input and the input of the high gain amplifier and adapted to supply an additional error signal with the first mentioned error signal, to the input of the high gain amplifier when the phase advanced error signal exceeds a predetermined value,
    the phase advance means comprising,
    a phase advance circuit, and
    a differential switching amplifier having one input connected to the output of the phase-advance circuit and the gher input connected to receive a fixed reference voltage,
    the output of the differential switching amplifier being connected to means for charging a capacitor, the voltage across the capacitor constituting the additional error signal,
    the phase advance means causing the additional error signal to rise asymptotically to a fixed level when the phase advance error signal exceeds the predetermined value and to decay asymptotically when the phase advance error signal falls below the predetermined value.

2. A gas turbine engine fuel control system as claimed in claim 1, comprising:
    means for detecting an error signal between the jet pipe temperature and the required temperatures, including, and signal comparison means connected to receive an electrical signal from the means for detecting the jet pipe temperature and a predetermined reference signal and adapted to produce the error signal when the value of said electrical signal exceeds the value of the reference signal.

3. A gas turbine engine fuel control system as in claim 1 wherein the system includes a solenoid connected to the output of the operational amplifier means.

4. A gas turbine engine fuel control system as claimed in claim 3, wherein the solenoid is included within the feedback loop of the operational amplifier means.

5. A gas turbine engine fuel control system as claimed in claim 4, wherein the solenoid is operatively connected to a valve in the fuel flow system of the gas turbine engine, whereby to reduce the flow of fuel to the engine when the value of said electrical signal exceeds the value of the reference signal.

* * * * *